United States Patent [19]

Adams et al.

[11] Patent Number: 5,110,448
[45] Date of Patent: May 5, 1992

[54] COKING PROCESS

[76] Inventors: Stephen P. Adams, 4272 Holly Hill Ct., Lake Charles, La. 70605; William R. Morrison, 11000 Gatesden, Apt. 207, Tomball, Tex. 77375

[21] Appl. No.: 668,006

[22] Filed: Mar. 12, 1991

[51] Int. Cl.$^5$ ................................. C10G 9/14
[52] U.S. Cl. ............................. 208/131; 208/48 Q; 585/650; 585/950
[58] Field of Search ............ 208/48 Q, 131; 585/650, 585/950

[56] References Cited

U.S. PATENT DOCUMENTS

| | | |
|---|---|---|
| 2,928,886 | 3/1960 | Nisbet et al. ...................... 208/48 Q |
| 3,342,724 | 9/1967 | Goering ............................ 208/48 Q |
| 3,360,587 | 12/1967 | Adams ............................... 208/48 Q |
| 3,366,702 | 1/1968 | Moriarty ........................... 208/48 Q |
| 3,674,890 | 7/1972 | Oleszko et al. .................... 208/48 Q |
| 3,718,708 | 2/1973 | Ozawa et al. ...................... 585/650 |
| 3,917,564 | 11/1975 | Meyers .............................. 208/131 |
| 4,168,224 | 9/1979 | Jansma ............................... 208/131 |
| 4,612,109 | 9/1986 | Dillion et al. .................... 208/131 |

Primary Examiner—Helane Myers

[57] ABSTRACT

Coker water from a delayed coking process is cooled and a water soluble, organic cationic surface active compound is introduced to produce a substantially water free oil stream and a substantially oil free coker water stream which can be returned to the coking process.

14 Claims, 1 Drawing Sheet

COKING PROCESS

FIELD OF THE INVENTION

The invention relates to processes for making coke from petroleum products and, in particular, to delayed coking processes using water for quenching the coking process and for cutting coke from coker drums. In a specific aspect, the invention relates to delayed coking processes for making high-quality needle coke free of metals and other contaminants.

SETTING OF THE INVENTION

In the delayed coking process, water is introduced into a coker drum to quench the coking process, to cool the drum and its coke contents, and to hydraulically cut and remove the coke. An aerosol produced during quenching comprises water and hydrocarbons which are separated to some extent in a "blowdown" or "quench" tower. The quench tower overhead stream comprises an oil-in-water emulsion which cannot be returned for quenching the coking process or for coke cutting before adequately separating the oil from the water. Water resulting from cooling the drum and cutting and removing the coke also comprises an oil-in-water emulsion. Current practice therefore requires disposal of the coker oil-in-water emulsion or extended periods of settling to remove oil.

Processes for making different grades of coke such as "sponge" coke, electrode (anode) quality coke, and needle coke differ primarily in the nature of the feedstocks used and, to some extent, in process conditions. In the typical delayed coking process for making "sponge" coke, a fraction of petroleum known as vacuum residuum or heavy bottoms which contains high contents of metal, sulfur, asphaltene and other contaminants is heated and provided to a coker drum for coke formation. For making electrode and needle quality coke, the feed is usually slurry from a fluid catalytic cracker which has been hydrotreated to remove metals and sulfur.

During coke formation, feed to a coker drum is heated to about 900°-950° F. and introduced into a coker drum to deposit a petroleum coke product in the drum while more valuable lighter ends of the feedstock are recovered overhead for further use. After the drum is filled with coke, it is switched from coking to decoking operation.

During decoking, the coke is steamed out and residual hydrocarbons are stripped from the coke. Cooling water is then applied to the drum. Hydrocarbons and steam coming overhead from the coke drum during quenching are provided to a quench tower or blowdown drum in which some of the hydrocarbons are removed by contact with a circulating hydrocarbon (oil) stream and are pumped back as feed to a fractionator column providing feed to the coker. The remaining hydrocarbons and most of the water are removed from the quench tower in the overhead stream in the form of an oil-in-water emulsion.

Liquid water used to cool and hydraulically cut and remove coke from the coker drums is removed from the base of the coking drums. After removal of green coke, the result is water containing suspended coke fines and emulsified hydrocarbons.

Thus, the delayed coking process favors creation of tight, difficult to break oil-in-water emulsions. During the early stages of quenching, a steam aerosol strips coke and reagents (some partially reacted) from the coker drums. During water flooding and cooling of the drums, further stripping of hydrocarbons occurs. During cutting of the coke, the hydraulic nozzles create high shear causing further hydrocarbon stripping and emulsification. Finally, artificial pumps creating shear are typically used to circulate the water-oil mixture in a delayed coker facility.

Previous practice after coker water has been recovered from the quench tower overhead stream or from the coker bottoms has been to dispose of the coker water or to send the coker water to settling tanks. However, even extended periods of settling are frequently ineffective to break the tight oil-in-water emulsion.

Disposal of coker water is wasteful and must be properly done to minimize environmental impact. Where oil content is excessive, recycled coker water injected into the coker drums (typically at a temperature of 500°-600° F.) may result in evaporation of hydrocarbons or even flashing. The oil-in-water emulsion has sometimes been estimated as high as 60% of the coker water even though hydrocarbon content may be 5% or less. Even during settling, such water may cause hydrocarbon pollution as hydrocarbons vaporize.

An improved delayed coking process is needed which substantially eliminates the need for disposal of coker water, reduces pollution and the potential of environmental harm and flashing without necessity for extended settling periods, and which generally improves efficiency and does not degrade coke quality or contribute to operating problems in the facility. Water content of recycled hydrocarbon to the coking process will desirably be as low as feasible; and hydrocarbon content of recycled coker water will be reliably low even during process upsets. By the invention herein described, these and other advantages can be realized.

SUMMARY OF THE INVENTION

According to the invention, a coker water stream comprising a hydrocarbon-in-water emulsion removed from a coker drum is treated, at an effective noncomposition decomposing temperature, with a composition effective for producing a hydrocarbon enriched phase substantially free of the composition and an aqueous phase substantially free of hydrocarbon and containing substantially all of the composition. At least a portion of each of the hydrocarbon enriched phase and the aqueous phase is returned to the delayed coking process.

In an aspect, the composition comprises an effective water soluble organic cationic surface active compound having a hydrophobic moiety consisting essentially of carbon and hydrogen and at least one hydrophilic moiety selected from the group consisting of —OH, —NH$_2$, and

and combinations thereof. In one aspect, the composition is selected from the group consisting of polydialkylaminoalkylmethacrylates and polyalkanolamines, optionally in the presence of a metal cation effective for further enhancing separation of hydrocarbon and water. In a further aspect, the composition is selected from the group consisting of polymers of dimethylaminoethylmethacrylate (DMAEMA), polymers of dimethylaminopropylmethacrylates (DMAPMA), and polymers of triethanolamine (TEA), having molecular weights of at least 50,000 a.m.u., optionally in the presence of metal cations selected from the group consisting of aluminum and zinc and combinations thereof.

In another aspect, the invention comprises an improved delayed coking process in which the composition is introduced into a quench tower overhead stream between overhead condenser and overhead settling drum and the emulsion is substantially broken prior to removal of water from the overhead settling drum.

The invention will be further understood and appreciated and other aspects and advantages will be apparent to those skilled in the art from the Figure and from the detailed description of the invention.

DETAILED DESCRIPTION OF THE INVENTION

Figure 1:
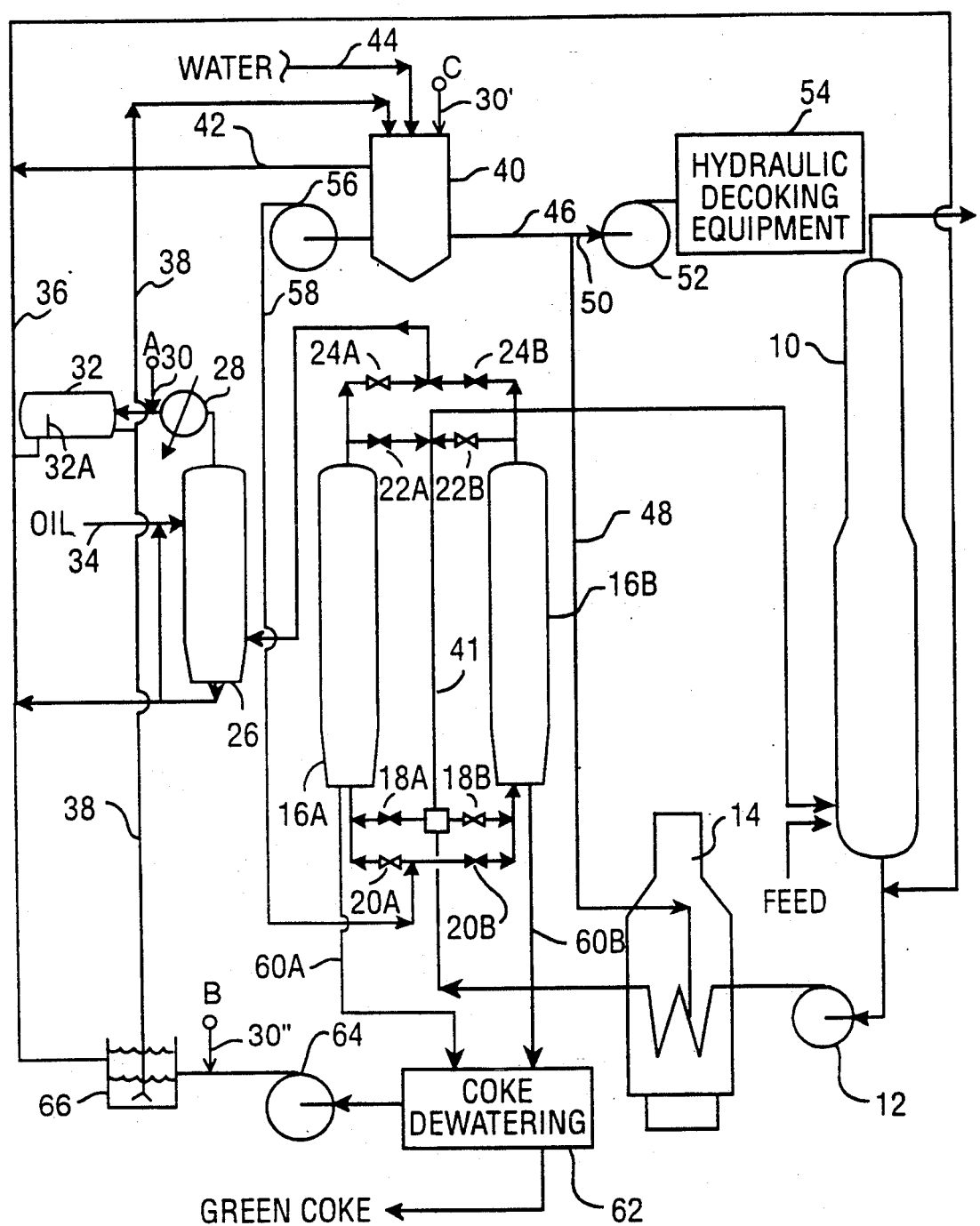
FIG. 1 represents schematically a delayed coking process and illustrates the method of the invention.

According to the invention, a composition comprising a water soluble surface active agent is used for substantially breaking an oil-in-water emulsion in a coker water stream of a delayed coking process.

As used herein, an emulsion is said to be substantially broken when at least 75% of the oil in the oil-in-water emulsion is separated into an oil continuous phase. Preferably, at least 90% or even 95% of the oil is separated into the oil continuous phase. See Example II below.

The composition can be any water soluble, cationic, cationic metals free composition effective for breaking the oil-in-water emulsions found in coker water of delayed coking processes. Cationic surface active compositions such as amines, amides, and the like are suitable.

Generally, the composition can comprise any effective water soluble organic surface active compounds having a hydrophobic moiety consisting essentially of carbon and hydrogen and a hydrophilic moiety selected from the group consisting of —OH, —NH$_2$,

and combinations thereof.

Preferably, the composition can comprise LMW (low molecular weight, i.e., 50,000–100,000 amu), MMW (medium molecular weight, i.e., 100,000–500,000 amu), and HMW (high molecular weight, i.e., >500,000 amu) water soluble polyalkylaminoalkylmethacrylates, but not methacrylamides, and polyalkanolamines.

More preferably, the composition can comprise LMW, MMW, and HMW polydimethylaminoethylmethacrylates ("poly-DMAEMA").

In a further aspect, any cationic metal ion effective for enhancing the oil-water separation efficacy of the organic water soluble polymers can be used together with the polymers. Preferably, aluminum and zinc cations may be used.

Where the delayed coking process is for production of fuel grade or sponge coke, preferred compositions include zinc and aluminum metal cations in conjunction with the polyalkanolamines or the polyalkylaminoalkylmethacrylates.

Where the delayed coking process is for production of electrode (anode) quality coke, or needle coke preferred compositions include the polyalkylaminoalkylmethacrylates in the substantial absence of cationic metal. As used herein, "substantial absence of metal ions" refers to a level of metal ions consistent with production of needle quality coke. Most preferable are those cationic surfactants effective for substantially breaking oil-in-water emulsions in coker water in twenty-five, ten, or even five minutes, or less. See EXAMPLE I below By use of the preferred surfactants, even during coking process upsets, recycle of oil via the coker water stream to a coker drum is minimized since most or all of the emulsion is broken during the normal process water flow time.

The polyalkylaminoalkylmethacrylates and polytriethanolamines useful in the practice of the invention are well known in the art and may be prepared using standard procedures, and also may be purchased from numerous specialty chemical supply houses. Detailed description of the method of making is therefore not required here.

Anionic surface active agents such as sulfates, sulfonates, phosphates and phosphonates are not suitable. These compounds when decomposed by high temperature conditions which prevail during quenching and coke removal in the coker drums result in sulfur and phosphorous metals being deposited in the coke. Further, in the case of sulfates and sulfonates, decomposition when recycled under ambient conditions and at pHs above 7.0 can result in sulfides which can precipitate, foul and corrode process equipment such as the fractionation column (combination tower) and other process equipment.

These difficulties are particularly severe when electrode quality (anode grade) or needle coke is being produced. Such coke is of sufficiently high quality as to be useful for the preparation of low metals content anodes, and for other highly specialized uses. As indicated above, feed to such cokers is typically slurry out of a fluid catalytic cracker (FCC), which has been hydrotreated to remove metals and sulfur. Use of a metals-containing demulsifier such as sulfates, phosphates, zinc chloride and the like results in a high metals content in the coker water when water is returned to the coker for quenching and for coke cutting and removal and in metals contamination of the product coke.

Sometimes, also, two coker operations are used in conjunction. For example, a sponge coker and an electrode quality coker or needle coker can be arranged to use one quench water and blowdown system. The effect of introducing a high-metals content quench water into the needle coker is to reduce the value of needle coke to near that of sponge coke and result in significant loss of revenue to the manufacturer.

In making fuel grade or sponge coke, metals contamination of the coke is of little concern since the metals content of fuel grade coke derived from petroleum is already much lower than the metals content of coal derived coke with which it competes in the marketplace. In making anode grade coke, however, contamination by metals such as aluminum, nickel, iron and silicon must be controlled. In making needle coke, contamination by all compounds which represent metals in The Periodic Table of The Elements, except Carbon and Hydrogen, must be controlled. In accordance with aspects of the invention, both anode quality and needle coke can be made without metals contamination of the coke.

Nonionic surfactants such as polymeric derivatives of ethylene or propylene oxides or propylene oxide-ethylene oxide blends are also generally not suitable. Since the water solubility of nonionics is due to hydrogen bonding or attraction of water for the oxygen of the alkaline oxide, and is reduced at elevated temperatures, most nonionic surfactants can become ineffective and even separate from solution.

Likewise, oil soluble surface active compositions are not suitable because under operating conditions, the content of oil-in-water emulsion in the quench tower overhead stream can vary widely during different parts of the cycle. During parts of the cycle where oil is relatively absent, oil soluble surface active compositions can effectively emulsify themselves in the quench water causing problems of their own. Further, oil soluble surface active demulsifying compositions have also been tried and have been found ineffective in breaking the emulsion. Moreover, oil soluble compounds which are returned in the oil phase to processing contain breakdown products such as sulfides which cause corrosion, foaming, and other difficulties in downstream equipment.

According to the invention, the composition is introduced into a coker water stream when the stream is at a temperature effective for not causing significant degradation of the demulsifying composition, preferably below about 250° F., more preferably below about 180° F., most preferably below about 120° F. Thus, referring to FIG. 1, discussed in detail below, introduction of the surface active composition ahead of quench tower 26, or even prior to cooling in the blowdown condenser 28, can result in degradation of significant amounts or most of the surface active agent prior to the time it is most needed.

The pH of the coker water stream at the time of introduction is maintained in the range of 6.5–11, preferably in the range of 6.5–8.5. At higher pH values, surfactants are less effective and tend to self-emulsify or to reemulsify the oil.

The composition is preferably introduced into the coker water stream in amounts effective to break at least part of and preferably to substantially break the emulsion. Preferably, the composition is metered into the coker water stream to accomplish a concentration in the coker water stream of from 5 to 100 ppm, most preferably in the range of about 10 to 60 ppm in the coker water stream. When metals such as zinc and aluminum cations are present, the metals content can preferably be in the range of 10 to 50 ppm and the content of organic demulsifier can be in the range of 10 to 90 ppm. Other metals, such as calcium, may also be useful.

Referring now to FIG. 1, FIG. 1 illustrates the delayed coking process for making fuel grade, anode grade, and needle coke and the use of the invention therein. The delayed coking process itself is well known The Table below provides a convenient reference to FIG. 1.

TABLE I

| | |
|---|---|
| 10 | Feed Fractionator Column |
| 12 | Coker Feed Pump |
| 14 | Coker Feed Furnace |
| 16A, B | Cokers (Coker Drums) |
| 18A, B | Coker Feed Inlet Valves |
| 20A, B | Coker Quench Inlet Valves |
| 22A, B | Coker Overhead Valves |
| 24A, B | Decoker Overhead Valves |
| 26 | Quench Tower (Blowdown Drum) |
| 28 | Quench Tower Overhead Condenser |

TABLE I-continued

| | |
|---|---|
| | (Blowdown Condenser) |
| 30, 30', 30" | Demulsifier Inlets |
| 32 | Quench Tower Overhead Drum |
| 32A | Baffle |
| 34 | Quench Tower Oil Feed |
| 36 | Feed Oil Recycle Line |
| 38 | Coker Water Recycle Line |
| 40 | Coker Water Settling Tank |
| 41 | Warmup Line |
| 42 | Settling Tank Feed Oil Recycle |
| 44 | Coker Water Makeup Line |
| 46 | Coker Water Line |
| 48 | Steamout Water Line |
| 50 | Decoking Water Line |
| 52 | Decoking Water Pump |
| 54 | Hydraulic Decoking Equipment |
| 56 | Coker Water Pump |
| 58 | Coker Water Line |
| 60A, B | Coke Slurry Lines |
| 62 | Coke Dewatering |
| 64 | Dewatering Pump |
| 66 | Dewatering Settling Tank |

Generally, the same delayed coking apparatus can be used for making fuel grade coke, anode grade coke, and needle coke. As known to those skilled in the art, the principal differences between making the various grades of cokes are in the nature of feedstocks and in certain process differences, such as temperature and the like. To ensure a low metals content coke, for example, in production of anode grade on needle coke, it is essential to ensure that the feedstock is clean of metals, and that the quench water does not contain undesirable metals. This may require control of contamination due to dust in the environment, quality monitoring of the feedstock, and the like.

A typical delayed coking process has two coking drums 16A, 16B, one drum such as 16B undergoing coking and the other drum such as 16A undergoing quenching, coke removal, and preheating for return to coking operations. Those skilled in the art will appreciate that controlling valves 18A & B, 20A & B, 22A & B, and 24A & B will interchange drums 16A and B.

During coking in drum 16B, a feedstock is introduced adjacent the bottom of fractionating tower 10 together with overhead vapors removed via line 41 from coke drum 16B. Light ends are removed overhead from tower 10 for other use (not illustrated). Heavy hydrocarbon coker feed is removed from the bottom of tower 10 by pump 12 at a pressure, for example, in excess of 450 psig and provided to furnace 14 where it is heated to an effective temperature for initiating the cracking reaction which results in coke formation. For fuel grade or sponge coke, this can be, for example, on the order of 910°–920° F., and for needle coke the temperature can be up to about 950° F. ±10°. Heated coker feed from furnace 14 is introduced into drum 16B via open valve 18B. In coker drum 16B, the thermal cracking reactions are completed and produce solid coke and a range of lighter products. The coke gradually fills the drum typically sized to take 24 hours capacity. The lighter vapors pass out of the top of the coker drum 16B to fractionation column 10 for recovery. Pressure in coking drum 16B is typically in the range of 30 to 100 psig.

Referring now to drum 16A, drum 16A is shown during decoking. When drum 16A is filled with coke to an appropriate level, the coker feed stream can be switched by valves 18A and 18B to drum 16B while drum 16A is cooled and decoked.

Decoking of drum 16A involves steaming out, quenching with water, hydraulic decoking and rewarming with hot vapors.

After switching, steam is applied as the first stage of quenching using water provided via tank 40, lines 46 and 48, and furnace 14 to drum 16A. This steaming out step requires up to several hours After steaming out, cooling water is slowly applied to drum 16A from tank 40 via pump 56, line 58, and valve 20A. At first water passes off as steam to quench tower 26 via valve 24A. Water addition to drum 16A is continued at a controlled rate for several hours until drum 16A has cooled sufficiently to fill with water.

After drum 16A is drained, the lid and base of drum 16A are removed for hydraulic decoking via decoking equipment 56 which is conventional and illustrated schematically. Decoking equipment 54 simply comprises a number of high pressure water jets at 2000 to 3000 psig which are lowered into the coke bed such as in drum 16A on a rotating drill string to cut the coke away from the walls of the drum.

Water in drum 16A is then drained via line 60A to coke dewatering equipment 62 from which green coke is removed for further processing and water is removed by pump 64 and dewatering settling tank 66 to settling tank 40. Settling tanks 40 and 66 can be separate as illustrated or only one settling tank may be used.

Drum 16A is then sealed and pressure tested and warmed up to operating temperatures using effluent vapors from on-line drum 16B, for example, via line 41.

It can be seen that water during the various phases of drum decoking is removed overhead from quench tower 26, cooled in condenser 28 and collected by blowdown settling drum 32 from which an oil-in-water emulsion, if present, is returned by line 38 to clean water storage tank 40. It can also be appreciated that the quantity of oil in the coker quench water can vary significantly during the various portions of the coking cycle.

In FIG. 1, quench tower 26 is configured as a typical coker blowdown system comprising blowdown condenser 28, blowdown settling drum 32, and settling tank 40. This system is utilized for both pollution control and for increased recovery of hydrocarbons. During the time that a drum, such as drum 16B, is being steamed out and cooled by water injection, steam and hydrocarbons stripped from the coke are directed to quench tower 26. In quench tower 26, hydrocarbons are condensed by oil stream 54 and pumped back by line 36 to fractionator column 10. Steam mixed with hydrocarbons removed overhead from the quench tower 26 is condensed in blowdown condenser 28 along with an amount of oil. The oil and water are to some extent separated in blowdown settling drum 32, for example, adapted with baffle 32A with the water going via line 38 to coker water tank 40, while the oil is returned via line 36 to column 10 or furnace 14.

Although some settling of oil from water occurs in condenser 28 and in drum 32 even in the absence of use of demulsifying composition in accordance with the invention, the aqueous phase removed by line 30 to tank 40 is typically a tight, difficult to break oil-in-water emulsion.

In accordance with the invention, an effective metals free, organic water soluble cationic demulsifier is introduced into the coker water system at an effective location and temperature, for example, via lines 30 (Point A), 30' (Point B), and 30" (Point C). Preferably, the composition is introduced into the quench tower overhead stream after cooling in overhead condenser 28, for example, at Point A, by line 30, to break the oil-in-water emulsion and produce an aqueous stream containing the water soluble demulsifier, and a substantially water and emulsifier free oil stream which can be returned to fractionator column 10.

In a needle coker, as indicated above, the preferred demulsifier is metals free so that no metals will be present in the coker water in vessel 40 to contaminate coke in drums 16A and 16B. Hence, in accordance with this aspect of the invention, electrode and needle grade coke production can proceed without degradation of coke quality.

Further, since the demulsifier is organic, any residual water with demulsifier present in cokers 16A and 16B at the start of coking will quickly decompose and leave decomposition by-products in the product coke that will not significantly or at all affect coke quality.

Also, decomposition of the demulsifier during steaming out, quenching and hydraulic removal of coke will not degrade the coke and will not create problems for downstream processing.

Further, since the demulsifier is oil insoluble, an oil stream substantially free of water and other compounds is produced which can be returned upstream or downstream of fractionator 10 for coking.

Since advantageously substantially all or all of oil from water phase should be removed prior to the water entering settling tank 40, preferably the water soluble, metals free, organic demulsifier is effective for breaking the oil water emulsion in less than five, more preferably in less than two minutes. Preferred compositions for this aspect of the invention are MMW poly-DMAEMAs and HMW poly-TEA with zinc cation. In this way, even during process upsets which dump large quantities of oil into the coker water system, substantial amounts of oil can be removed in settling drum 32 and substantially the rest can be removed from storage tank 40 by line 42.

EXAMPLE I

Coker quench water from a delayed coking process comprising about 2% (20,000 ppm) oil in the form of a oil-in-water emulsion is placed in a series of bottles, treated separately with about 40 ppm of each of the following compositions and evaluated based on water clarity, degree and quality of interface, and quality of water. The results are shown in the following Table in the designations E, G, F, P having meaning as described.

| Run | Composition | Performance | Comments |
|---|---|---|---|
| 1 | HMW poly-DMAPMAA | P | Emulsion did not resolve at all. |
| 2 | MMW poly-DMAPMAA | P | Same as above. |
| 3 | LMW poly-DMAPMAA | P | Same as above. |
| 4 | LMW Micellar Polymer | P | Same as above. |
| 5 | HMW poly-DMAPMAA + Ferric Sulfate | P | Same as above. |
| 6 | LMW poly-TEA | P+ | Partial resolution in one (1) hour; emulsion never completely resolved. |
| 7 | HMW poly-TEA | F− | Partial resolution in 45 minutes; water hazy. |
| 8 | HMW Polyacrylamide emulsion polymer | F− − − | After two (2) hours, sample better than |

| Run | Composition | Performance | Comments |
|---|---|---|---|
| 9 | LMW poly-DMAEMA | F+ | untreated but emulsion remained. Emulsion resolved after 25 minutes; water not crystal clear. |
| 10 | LMW poly-DMAEMA | G− | Same as No. 9. |
| 11 | MMW poly-DMAEMA + Aluminum Chloride | G− | Resolved after 17 minutes; water slightly hazy indicating some oil entrainment. |
| 12 | MMW poly-DMAEMA | E− | Emulsion resolved after 5 minutes; water sparkling clear after 10 minutes. |
| 13 | HMW poly-TEA + Zinc Chloride | E+ | Emulsion resolved immediately; water sparkling clear. |

E Excellent quality water; sparkling clear; good oil; negligible interface.
G Good quality water; clear; but not sparkling; oil not as good.
F Fair quality water; cloudy; unable to see all the way through the bottle.
P Poor quality water; dark brown emulsified water.

The following symbols indicate degree of clarity + or −, i.e., G+ (very clear) or G− (not very clear). Note: poly-DMAEMA is a polymer of dimethylaminoethylmethacrylate; poly-DMAPMAA is a polymer of dimethylaminopropylmethacrylamide.

Results

Runs 1-4, 6, 7, 9, 10, and 12 indicate, among cationic water soluble metals free compositions heated, that best performance is achieved with the poly-DMAEMAs (Runs 9, 10, 12) and further among the poly-DMAEMAs that best results are obtained with MMW poly-DMAEMA (Run 12). The MMW poly-DMAEMAs are a preferred composition for electrode quality and needle cokers. The results indicate that poly-DMAPMAAs (methacrylamides) are ineffective.

Runs 6 and 7 indicate that polytriethanolamines perform better than the poly DMAPMAAs (methacrylamides) and better than the oil soluble polymer of Run 4. The low molecular weight TEA performs less well than the soluble polyacrylamide emulsion polymer of Run 8; however, the MMW poly-TEA performed somewhat better Runs 11 and 13 indicate that aluminum and zinc cations improve performance of poly-TEAs and poly-DMAEMAs respectively. Run 13 shows that best performance is achieved by a composition comprising poly TEA and zinc chloride which can be utilized in sponge cokers, but not in needle cokers.

Run 5 indicates that ferric ion fails to improve performance of HMW poly-TEA, although zinc ion greatly improves performance (Run 13).

Specialty chemical products were also tested with results as shown in the following table.

| Run | Composition | Performance | Comments |
|---|---|---|---|
| 14 | Mercaptan Specialty Product | F−− | Cloudy |
| 15 | Anticline/Formaldehyde Specialty Product | F | Emulsion did not resolve at all. |

EXAMPLE II

In a plant making needle coke, oil content in water draw from overhead drum 32 was 20,000 ppm prior to treatment and oil content in water draw from water storage tank 40 was 371 ppm. Treatment with MMW DMAEMA at 20 ppm reduced oil content of water draw from settling drum 32 to 1000 ppm for an effective recovery of 95% of the oil contained in the emulsion and reduced oil content of water draw from tank 40 to 93 ppm for an improved oil recovery from this stream of 75%.

While the invention has been described in terms of specific and preferred embodiments, the invention is not limited thereto but by the following claims interpreted in accordance with applicable principles of law.

What is claimed is:

1. In a delayed coking process in which a hydrocarbon feedstock is converted to coke in a coker drum and coke is therefore removed from the coking drum using an aqueous stream the steps comprising:
   removing a coker water stream comprising water and hydrocarbon from coking drum;
   introducing into the coker water stream a composition effective for separating the water and hydrocarbon of the coker water stream and producing a hydrocarbon enriched phase substantially free of said composition and an aqueous phase substantially free of hydrocarbon and containing substantially all of said composition, the composition being introduced into the coker water stream at an effective non-composition decomposing temperature;
   returning a stream of the hydrocarbon enriched phase to the delayed coking process in hydrocarbon feedstock thereto; and
   removing a stream of the aqueous phase and returning it to coking drum.

2. The method of claim 1 wherein said composition comprises an effective water soluble organic cationic surface active agent having hydrophobic moiety consisting essentially of carbon and hydrogen and hydrophilic moiety selected from the group consisting of OH, NH, $NH_2$ and combinations thereof.

3. The method of claim 1 wherein
   the composition is effective for separating the water and the hydrocarbon in a period of time less than five minutes.

4. The method of claim 1 wherein:
   the composition comprises a water soluble organic cationic demulsifying composition selected form the group consisting of polydialkylaminoalkyl methacrylates and polyalkanolamines.

5. The method of claim 1 wherein:
   the composition comprises a water soluble organic cationic demulsifying composition selected from the group consisting of polymers of dimethylaminoethylmethacrylate, polymers of dimethylaminopropylmethacrylate and polymers of triethanolamine having molecular weights of at least 50,000.

6. The method of claim 1 wherein the delayed coking process comprises
   introducing an effective coking feedstock into a coker fractionator and producing fractionator bottoms;
   introducing the fractionator bottoms into a furnace and heating to an effective coking temperature in the range of 900°–960° F.;

introducing the heated fractionator bottoms into coker drum under effective coking conditions and producing coke and continuing producing coke until the coker drum is predominately filled with coke;

removing said coking drum from coking and introducing coker water comprising said composition into said coking drum under conditions effective for cooling said coking drum and for removing coke therefrom;

removing coker water from the coking drum and cooling to a temperature less than about 120° F. and introducing an effective amount of said composition thereinto;

providing said coker quench water to a settling drum;

removing a stream of the oil enriched phase substantially free of said composition from the settling drum and returning said stream as feed to one of the coker fractionator and the furnace;

removing a stream of the phase substantially free of oil and containing substantially all of said composition from the settling drum and returning said stream as coker quench water to the coking drum;

reheating the coking drum to effective coking temperatures and introducing heated bottoms thereinto and producing coke from the composition and the heated bottoms.

7. The method of claim 1 comprising
introducing the demulsifying composition into the coker water after removal of the coker water from the coking drum.

8. The method of claim 7 comprising:
introducing the composition into the coker water in a blowdown system of the delayed coking process between an overhead blowdown condenser and a blowdown overhead drum.

9. The method of claim 7 comprising:
introducing the composition into the coker water removed from the bottom of the coker drum prior to introduction of coker water into a settling tank.

10. The method of claim 7 comprising:
introducing the composition into the coker water in a settling tank for the coker water.

11. The method of claim 5:
wherein the delayed coking process is effective for making needle coke and
wherein the composition consists essentially of effective polydialkylaminoalkylmethacrylate.

12. The method of claim 5:
wherein the delayed coking process is effective for making sponge coke and
wherein the composition as selected from the group consisting of effective polydialkylaminoalkylmethacrylates and polyalkanolamines in the presence of metal cation effective for further enhancing separation of hydrocarbon and water.

13. The process of claim 1 wherein:
the composition comprises a water soluble organic cationic demulsifying composition selected from the group consisting of polydialkylaminoalkyl methacrylates and polyalkanolamines, optionally in the presence of a metal cation effective for enhancing separation of hydrocarbon and water.

14. The method of claim 1 wherein:
the composition comprises a water soluble organic cationic demulsifying composition selected from the group consisting of polymers of dimethylaminoethylmethacrylate, polymers of dimethylaminopropylmethacrylate and polymers of triethanolamine having molecular weights of at least 50,000, optionally in the presence of metal cations selected from the group consisting of aluminum and zinc and combinations thereof.

* * * * *